Patented Sept. 7, 1954

2,688,633

UNITED STATES PATENT OFFICE 2,688,633

SULFONATION OF ALKYL AROMATIC HYDROCARBONS

Charles A. Cohen, Roselle Park, N. J., assignor to Standard Oil Development Company, a corporation of Delaware No Drawing. Application July 28, 1950, Serial No. 176,545

5 Claims. (Cl. 260—505)

This invention is concerned with the purification of alkyl aromatic hydrocarbons or mixtures of alkyl aromatic hydrocarbons, which are useful in the production of solvents, insecticide carriers, raw materials for the production of synthetic detergents, lube oil additives and the like. More particularly, it is concerned with the purification of alkyl aromatics having at least one nuclear substituted alkyl chain containing from 6 to 21 carbon atoms, preferably from 10 to 18 carbon atoms attached to an aromatic nucleus; for example, benzene, toluene, xylene, naphthalene, tetralene, cumene and cymene. Specifically, the invention is concerned with the purification of alkyl aromatic hydrocarbon of the above type prior to sulfonation of the alkyl aromatic with strong sulfuric acid to form a sulfonated alkyl aromatic hydrocarbon.

The nuclear substituted side chain of the alkyl aromatic may be derived by an alkylation process starting with a branched chain olefin or normal olefin. The olefin employed may be obtained by a number of methods such as by dehydration of an alcohol; by cracking of a hydrocarbon, such as wax, kerosene, or other petroleum hydrocarbon; or by the polymerization of a lower olefin, or co-polymerization of mixed lower olefins or by means of the hydrocarbon synthesis reaction in which carbon monoxide and hydrogen are reacted in the presence of a catalyst, etc. Among other methods of obtaining alkyl aromatic derivatives is the condensation of a fatty alcohol or secondary or tertiary alcohol with an aromatic hydrocarbon by means of an alkylating agent, such as sulfuric acid, zinc chloride and the like.

In the process of producing alkylated aromatics by the means outlined above, it is common practice to use an excess of the aromatic substituent, especially in those cases where polyalkylation is to be avoided. In working up the crude alkylation mixture after removal or inactivation of the alkylation catalyst, the main alkylate is usually separated by distillation in which the unreacted aromatic is first recovered along with some unreacted alkylating substituent, such as olefin or olefin polymer and the crude alkylate obtained as either a bottoms or separated by fractionation into a narrow boiling fraction. The crude material prepared in this manner is very often contaminated with olefinic and polymeric material, sulfur and sulfur-containing products present in either the hydrocarbon feed used for producing the alkylate or produced during the process of alkylation, and labile alkylated products which readily cleave in treating processes such as sulfonation to give rise to olefinic and polymeric products.

The objects of this invention are to reduce the unsaturation of alkyl aromatic hydrocarbons to a point where subsequent chemical treatment, for example, sulfonation, will not render the end product subject to contamination with either an olefin or a polymeric material resulting from the olefin. A further object of the invention is to remove those labile constituents present in the aromatic, which give rise to degradation products on subsequent chemical treatment, particularly, sulfonation with strong sulfuric acid, and the presence of which is characterized by the production of off-color, malodorous sulfonated products. A further object of this invention is to remove or reduce the sulfur and/or sulfur-containing products present in the crude alkylated aromatic, which on subsequent treatment with strong sulfuric acid, as for example, in the production of sulfonated detergents, give rise to hydrogen sulfide and the like, which cause corrosion of the sulfonating equipment and produce undesirable odors in the finished product. In addition to the above, it is the object of this invention to produce a finished alkyl aromatic derivative, which on sulfonation with a strong sulfuric acid, will be substantially free of unsulfonated (oily) products in the neutralized sulfonated material.

These and other objects of the invention are accomplished by treating the alkyl aromatic hydrocarbon or mixture of alkyl aromatic hydrocarbons with sulfuric acid of a strength between 90% and 98% by weight in an amount of from about 5 to 50 lbs. per barrel (42 gals.) of alkyl aromatic at a temperature of from 10° C. to 70° C., separating the resulting sludge, removing the dissolved $SO_2$, percolating and/or contacting the acid treated alkyl aromatic with a sorbent material, such as clay, and thereafter sulfonating the purified alkylate with a sulfonating agent such as strong sulfuric acid, fuming sulfuric acid, $SO_3$, etc.

The treating process of this invention is applicable to alkyl aromatic hydrocarbons produced as raw alkylate after topping to remove both the unreacted aromatics and the unreacted olefins or it can be performed on a narrow fraction of alkyl aromatics which has been distilled from the mixture. Since we prefer to apply this invention as a final finishing stage in the production of a pure alkyl aromatic hydrocarbon prior to sulfonation, it is desired to perform any fractionation that is required prior to the application of the acid treatment.

ACID TREATMENT

The acid treatment may be performed in conventional tank and propeller equipment in a batch process, or by the use of air-blowing in a tank, also in batch process, or in a continuous manner by means of disc and doughnut-pipe arrangement, or by a pierced plate pipe arrangement, or countercurrently in a tower, having either trays or packing of inert character such as porcelain Raschig rings, or by means of a mixer and settler. The acid employed in the treatment is sulfuric acid, which may vary in strength from about 90 to 98% by weight. While lower strength acids, for example, down to 85% by weight, could be employed, the amounts required would be excessive and the efficiency low, and higher acid strength than 98% can be employed, but the resulting losses, due to sulfonation of the main alkyl aromatic, progressively increase. By the subsequent processes used in purification of the alkylate, that part of the alkyl aromatic which is sulfonated is removed by the clay and lost. For most alkylated aromatics, the amount of acid employed in the treatment will vary from about 1% to about 10% by volume of the alkyl aromatic being purified. In general, the higher the acid strength employed, the lower the quantity of acid which will be required. The acid strength employed will depend upon the nature of the alkyl aromatic in that an alkyl benzene, for example, can stand a higher acid strength without undue sulfonation losses than a corresponding alkyl toluene derivative. The contact time will depend upon the degree of agitation, and where good mixing is used, such as a turbo-mixer, a contact time in the order of 10 minutes may suffice. In purifying benzene and toluene derivatives, containing from $C_9$ to $C_{18}$ as a side chain, the use of 95% by weight sulfuric acid, for example, at a temperature of 20° C. to 40° C. does not entail any serious loss of the main body of the alkylate when contact times of up to two hours are employed. The temperature at which the acid treatment is conducted may vary from about 10° C. to as high as 70° C., preferably 30° C. to 60° C. A temperature of 30° C. to 60° C. gives good efficiency in the use of the acid and also permits rapid settling of the resulting sludge. Where the nature of the crude alkyl aromatic, for example, the raw alkylate is such that a high percentage of impurities is present, it may be desirable to split the total amount of acid used into a number of small dumps with intermediate settling and removal of acid sludge. The criterion employed for determining when a sufficient amount of acid has been used is to finish a small amount of the acid treated alkyl aromatic in a manner described below (removing $SO_2$ and clay contacting) and then determine the A. S. T. M. Acid Wash Color of the finished alkyl aromatic. It has been found that when an alkyl aromatic finished, by this manner, has an acid wash color, numerically less than 4, it is possible to obtain on subsequent sulfonation with strong sulfuric acid, a perfectly white, odorless and oil-free sulfonation product, which does not develop rancidity on storage. The treatment with sulfuric acid to an Acid Wash Color of 4 or less is not a critical limitation of this invention since for some uses an acceptable product can be produced from an alkyl aromatic having an Acid Wash Color of 10.

In the course of the acid treatment the unreacted olefinic and/or olefin polymeric material in the crude alkyl aromatic is sulfonated to form an alkyl sulfate, an alkyl sulfonate, and/or an alkyl hydroxy sulfonate, and depending upon the molecular weight of the sulfuric acid derivative, some of these products will be dissolved in the acid sludge which separates from the acid treatment, and some will remain dissolved in the upper oily layer. In addition, some crude aromatic alkylates, depending either on the source of the alkyl group or on the method employed for substituting the alkyl group on the aromatic nucleus, are particularly frangible in the presence of sulfuric acid and tend to cleave or dealkylate from the aromatic nucleus, thus leaving an aromatic nucleus with no alkyl side chain or with a shortened side chain, which if not removed in a preliminary purification step, would give rise to oily unsulfonated product in the finished sulfonate. By the above outlined acid treatment, these materials are accordingly removed by the process of sulfonation and partly dissolved in the sludge and partly in the oil.

While the above acid strength and method of treating the alkylate represent commonly available means, it has also been found that gaseous $SO_3$ containing, but not of necessity, any $SO_2$, such as process gas from a contact converter, may be used in limited dosage to effect the same degree of treatment obtained with the liquid sulfuric acids of 90 to 98° strength.

$SO_2$ REMOVAL

After the alkyl aromatic has been acid-treated and the resulting sludge separated, it is possible to neutralize the sour alkyl aromatic with an alkali and wash with either water or immiscible solvent to remove the above-mentioned dissolved degradation products. However, a material treated in this manner possesses a considerable color and odor, which is carried through to the final sulfonation product. Furthermore, conventional decolorization, by contacting with clay or percolating through clay, result in a short clay or filter life. If instead of neutralizing and washing, the acid-treated alkyl aromatic is contacted or percolated directly with clay, a short filter life also results which is, in a measure, proportional to the $SO_2$ content of the acid-treated oil.

It has been found that a superior product is obtained if the $SO_2$ is first removed in an anhydrous state by blowing either with air or inert gas, such as nitrogen or by means of vacuum stripping. Experiment has shown that no limitation on the efficiency of the acid-treatment with clay resides in the particular manner used for removal of the $SO_2$, since equally efficient results are obtained by blowing a volume of the sour oil with air in a tank or by permitting the sour oil to trickle downwardly through a packed tower while blowing countercurrently with air or applying vacuum to the tower so as to strip the $SO_2$ from the oil. Under these conditions of $SO_2$ removal, a perfectly odorless, colorless and stable alkyl aromatic is obtained on subsequent clay contacting or clay percolation. In addition, the purified oil sulfonates with strong sulfuric acid to give a colorless, odorless and stable sulfonation product, containing no unsulfonated material. The degree of $SO_2$ removal, by whatever means accomplished, may be followed by simple iodometric means, and it has been found that the presence of dissolved acidic material in no way interferes with this determination.

The temperature used for removal of the $SO_2$ is not critical, but since the $SO_2$ is in a dissolved state, possibly in association with other acidic materials dissolved or suspended in the acid treated alkyl aromatic, a higher temperature is more favorable for the release of the $SO_2$ in a gaseous state. For general purposes the same range of temperatures used for acid treatment, i. e., 10° to 70° C., may be employed for $SO_2$ removal. In no case should a temperature be used which is high enough to cause decomposition or charring of the product. Due to the surface active nature of some of the materials present in the alkyl aromatic at this stage in processing, excessive foaming may occur on air or inert gas blowing or vacuum stripping and it may be desirable to add small amounts of foam breakers such as silicone compounds, alcohols and amides which are subsequently removed by clay treatment.

CLAY TREATING

The simplest means for treating the acid-treated, $SO_2$-stripped alkyl aromatic with sorbent material is to use a percolation tower in which a sorbent material is packed, such as Attapulgus clay, Floridin, fuller's earth, or similar bleaching clay, preferably having a particle size of through a 30 mesh screen, not through a 60 mesh screen. Clays suitable for the practice of this invention are naturally active clay or activated clays such as acid-treated bentonitic clays. Nearly all suitable clays belong to the montmorillonite group of minerals, for example, montmorillonite, beidellite or saponite. While the above clays, which are distinguished by having a hydrous or hydrated magnesium aluminosilicate composition are most commonly available, other materials which are prepared by synthetic means may be used. The percolation tower may have a height to diameter ratio of 20:1, although this is not a limiting factor. The alkyl aromatic is permitted to percolate through the clay at a rate of from 1 v./v./hr. to as low as .01 v./v./hr. The effluent from the tower is perfectly water-white in color (plus 30 up Saybolt color), odorless, neutral in reaction and is stable on storage with respect to color and odor. During the process of percolation, the clay selectively removes or affixes all of the acidic materials of a polymeric and olefinic nature, which are associated with sulfuric acid and which give rise to off-odor and off-color products on subsequent sulfonation with strong sulfuric acid. The $SO_2$-stripped sour oil is permitted to percolate through the clay until the clay becomes exhausted, which is characterized by the effluent becoming off-color. With a freshly burned Attapulgus clay, having a 30 to 60 mesh particle size, a yield of alkyl aromatic, for example, a dodecyl benzene which had been treated at 35° C. with 5% by volume of 95% by weight sulfuric acid, the acid sludge removed, the $SO_2$ stripped by means of air blowing and then percolated through a column of the above clay, a yield equivalent to 10,000 gals. of finished alkyl aromatic per ton of clay was obtained, having inspections shown below.

After exhaustion of the clay, the alkyl aromatic contained in the clay may be recovered by either solvent extraction or displacement with water and the clay regenerated by reburning in a kiln In all cases, it should be noted that both the $SO_2$ removal and the clay contacting is carried out under anhydrous conditions or at most, in the case of clay treating, with only the normal water of hydration present in the clay when burned at temperatures in the range of 150° C. to 500° C. All clays which have been found suitable for the decolorization of petroleum distillates, for example lube oils, medicinal white oils and the like, have also been found to be suitable for the practice of this invention. While the ordinary bleaching clays are most readily available and entirely suitable for the practice of this invention, other sorbent materials, such as various activated charcoals and mixtures of these materials with clays, with or without added fixed alkalies, such as lime and the like, may be employed and are within the purview of this invention.

SULFONATION

The sulfonation of the acid-treated, $SO_2$-stripped and clay-contacted or clay-percolated alkylate is accomplished by any one of a number of methods utilizing either sulfuric acid having acid strengths from approximately 100% sulfuric acid up to anhydrous sulfur trioxide, or by means of chlorosulfonic acid or by the use of special reagents such as sulfuric acid-acetic anhydride, sulfur trioxide and pyridine, sulfur trioxide and dioxane. The sulfonation may be run in either a batch process or in a continuous process and the quantity of sulfonating agent may be used in an amount equal to approximately a mole ratio or may be used in excess. Where the finished sulfonate is to be used as an aqueous detergent, common practice usually produces a saleable product in which the active ingredient content may approximate concentrations on the finished product between 40 and 60 wt. %, the remainder being usually sodium sulfate or other additives. Where a simple detergent composition consisting of a sodium alkyl aryl sulfonate and sodium sulfate is required, it is usual to use an excess of sulfuric acid calculated so that on direct neutralization of the total sulfonation mixture, a product containing approximately 40% of active ingredient is produced, the remainder being sodium sulfate. Where the final product is to contain added materials such as phosphates, carboxymethyl cellulose, optical bleaches, and the like, it is usual to use a quantity of sulfuric acid usually in the form of fuming sulfuric acid such that on completion of the sulfonation and neutralization of the entire sulfonation mixture a product containing approximately 60% of active ingredient is obtained. When the 60% active product is blended with phosphates and other materials and then dried the active ingredient content will approximate between 30 and 40 wt. % on the total.

For certain uses it is desirable to have an inorganic salt content which would be as low as possible, particularly in the case of the higher alkyl aryl sulfonates, and in such instances the manufacturer can either produce by sulfonation and by direct neutralization a solution containing from 40–60% of active material, and then purify this product by means of alcohol or other means described in the art (see U. S. Patent 2,497,152) or one may use very high strengths of sulfuric acid, in particular anhydrous sulfur trioxide, and sulfonate usually in a solvent such as liquid sulfur dioxide, aceto nitrile, various chlorinated solvents which are unattacked by sulfuric acid or sulfur trioxide so that after removal of the solvent and any $SO_2$ formed in the sulfonation, and neutralization of the product, a material is obtained which is substantially free of inorganic salts. Table I shows the sulfonate yields obtained with various strengths of sulfuric acid from approximately 100% sulfuric acid to 104½% sulfuric acid (oleum containing 20 wt. percent dissolved $SO_3$) utilizing various mol ratios of acid to alkylate, when a dodecyl benzene made from a polymerized olefin and benzene are purified according to the process of this invention and then sulfonated. For ordinary purposes oleum may be utilized for sulfonation in the manner described in Part A of Example 1. Example 3 below illustrates the use of anhydrous liquid sulfur trioxide dissolved in liquid sulfur dioxide as a sulfonating agent.

*Table I*

SULFONATION OF DODECYL BENZENE

| Acid Strength, Wt. Percent | Gms. Acid Used | Calculated Wt. Percent Active on Complete Neutralization | Mols Acid × Theor. | Sulfonate Yield, Mol. Percent |
|---|---|---|---|---|
| 99.5 | 83.6 | 40 | 4.85 | 98.6 |
| 99.5 | 60.4 | 50 | 3.51 | 95.1 |
| 99.5 | 48.1 | 60 | 2.78 | 81.0 |
| 99.5 | 40.1 | 70 | 2.32 | 68.4 |
| 101.8 | 57.4 | 50 | 3.42 | 98.1 |
| 101.8 | 45.2 | 60 | 2.68 | 95.6 |
| 101.8 | 36.6 | 70 | 2.18 | 78.1 |
| 103.0 | 57.0 | 50 | 3.43 | 100.8 |
| 103.0 | 46.5 | 60 | 2.82 | 96.6 |
| 103.0 | 34.7 | 70 | 2.09 | 83.6 |
| 104.5 | 44.7 | 60 | 2.72 | 100.6 |
| 104.5 | 39.3 | 65 | 2.39 | 98.4 |
| 104.5 | 33.4 | 70 | 2.04 | 87.7 |

50 ml. dodecyl benzene (43.2 gms.) used for all sulfonations. Time 1 hour, temperature 60° C. except oleum (104.5%) 50° C.

The following examples serve to demonstrate the process of this invention.

EXAMPLE 1

Dodecyl toluene was prepared by the alkylation of toluene with a $C_{12}$ fraction of an olefin polymer having a boiling point range of 180° to 220° C., using a Friedel-Crafts type of alkylating agent. At the completion of the reaction, the alkylating agent was separated from the reaction mixture, the oily product washed with water and alkali and then fractionally distilled. A forerun consisting of excess toluene and a small amount of unreacted olefin was removed up to a temperature of 220° C., next under diminished pressure was obtained a small fraction consisting of degradation products, comprising lower boiling toluene alkylates formed through cleavage of the olefinic polymer, boiling between 220° to 295° C., next a heart cut comprising dodecyl toluene boiling between 295° to 310° C. equal to 88 mol per cent yield based on the olefin fed to the alkylation unit and finally a small bottoms representing higher alkylated toluene and polymeric products and some hold-up in the fractionating tower.

Inspections on the crude dodecyl toluene heart cut was as follows:

Color—Saybolt (A. S. T. M.—D156–38) ___ +10
Acid wash color (A. S. T. M.—D848–45T) __ 14
Bromine No. (A. S. T. M.—D875–46T) ____ 2
Density 20°/40° C _____ 0.8698
Refractive index 20° C./C _____ 1.4905
Average molecular weight (cryoscopic) ___ 258

The above crude dodecyl toluene was divided into four portions and treated respectively as follows:

Part A.—Fifty grams of the crude dodecyl toluene contained in a sulfonation flask fitted with a stirrer and thermometer were cooled to 0° C. by means of a Dry Ice-alcohol bath. To the flask were then added 70 grams of 20% $SO_3$, fuming sulfuric acid over the course of 10 minutes while maintaining the temperature at 15° to 20° C. The mixture turned a deep brown in color. When all the acid had been added, the temperature was raised as rapidly as possible to 55° C. and stirring continued for an additional 10 minutes. The total time for sulfonation was 20 minutes. At the conclusion of the reaction the flask contents were poured onto about 300 grams of ice, neutralized with 30% NaOH to a pH of 7.0 to 7.5 while maintaining the temperature below 60° C. and then diluted to a liter with water after adding 100 ml. of 99% isopropyl alcohol in order to ensure complete solubility. Aliquots of the solution which had a deep amber color were taken and analyzed for color, deoiled total solids (sodium dodecyl toluene sulfonate, sodium sulfate), pure sulfonate and oil by petroleum ether extraction, by slight modifications of the methods given in A. S. T. M.—D855–46T. The remainder of the solution was adjusted to a 40% active ingredient content and drum-dried on a two-roll stainless dryer using 65# gage steam on the rolls. The dried product was examined for color, odor, sticking qualities, hygroscopicity and detergency. The results are shown in Table II below.

Part B.—A quantity of the crude dodecyl toluene was treated with 5% by volume of a reagent grade 95.5% sulfuric acid at a temperature of 30° to 35° C. with good stirring for a period of one hour, and the mixture permitted to settle 16 hours. The volume of oil recovered was equal to 99% of the crude alkylate taken for the treat. With no further purification, 50 grams of the oily upper-layer were sulfonated with 70 grams of 20% fuming sulfuric acid in the same manner outlined in Part A. After sulfonation was complete, the product was worked up in the same manner shown above and analyzed. The results are shown in Table II below.

Part C.—A quantity of the acid-treated dodecyl toluene made in Part B, after separation from the sludge was carefully neutralized with aqueous sodium hydroxide, water-washed a number of times to remove neutralized acidic materials and dried by filtration through heavy blotter paper. During the early washing steps, it was necessary to add small amounts of alcohol to break troublesome emulsions which formed. Inspections on the dodecyl toluene treated above were as follows:

Color—Saybolt _____ +20 (yellow)
Acid Wash Color _____ 5
Bromine No. _____ 0.3
Sulfur _____ 0.2
Halogen (as chlorine) _____ 0.06

Fifty grams of the acid-treated, neutralized and washed alkylate were sulfonated with 70 grams of 20% oleum and analyzed as in Part A above. The results are given in Table II.

*Part D.*—A quantity of the acid-treated dodecyl toluene made in Part B above, after separation from the sludge was titrated in the cold with 0.1 normal sodium hydroxide. In order to provide good contact, 100 ml. of neutral 80% isopropyl alcohol was added to the titration flask. The total acidity expressed as sulfuric acid was found to be 0.78 gram per 100 grams of acid-treated product. A second aliquot was gently boiled with a quantity of water to displace the $SO_2$ and then titrated. The residual acidity expressed as $H_2SO_4$ was equal to 0.14 gram per 100 grams of original acid-treated product. The remainder of this portion was gently blown with a stream of dry air at ambient temperature for about one-half hour at the end of which time no odor of $SO_2$ could be detected. Titration of a sample with standard iodine solution showed an $SO_2$ content of 0.002 gram per 100 grams of product. The air-blown material was then allowed to percolate under a slight hydrostatic head through 3% by weight of a bed of Attapulgas clay, having a grain size of 30 to 60 mesh. The clay was contained in a tower having a height to diameter ratio of 20:1. Prior to use, the clay was activated by burning for one-half hour at 450° F. The residual moisture in the clay based on a dead-burnt clay made at 700° C. was found to be about 6.5%.

The effluent from the percolation tower was perfectly water-white in color, free of odor, bland in taste and showed the following inspections on analysis:

| | |
|---|---|
| Color—Saybolt | +30 up (water-white) |
| Acid Wash Color | 1 |
| Bromine No. | 0.0 |
| Sulfur | 0.003 |
| Halogen (as chlorine) | 0.002 |
| Per cent carbon | 87.63 |
| Per cent hydrogen | 12.37 |
| Density 20/4° C | 0.8698 |
| Refractive index 20°/D | 1.4958 |
| Refractive index 20°/G | 1.50583 |
| Specific Dispersion ×10₄ | 175.3 |
| Extinction $K_{2650A°}$ | 1.38 |

Fifty grams of the above purified alkylate were sulfonated with 70 grams of 20% oleum and analyzed as in Part A. The results are given in Table II.

C. using a Friedel-Crafts type of alkylating agent. At the completion of the reaction the alkylating agent was separated from the reaction mixture, the oily layer washed with water and alkali and then fractionally distilled. A fore-run consisting of excess benzene and a small amount of unreacted olefin was removed up to a temperature of 220° C. Next, under diminished pressure, there was obtained a small fraction consisting of degradation products comprising lower boiling benzene alkylates formed through cleavage of the olefinic polymer, boiling between 220–280° C.; next a heart cut comprising dodecyl benzene boiling between 280° C. to 290° C. equal to a 78 mol per cent yield based on the olefin feed to the alkylation unit; and finally a small bottoms representing higher alkylated benzene and polymeric products and some hold-up in the fractionating tower.

Inspections on the crude dodecyl benzene heart cut were as follows:

| | |
|---|---|
| Color-Saybolt | +14 |
| Acid Wash Color | 10 |
| Bromine No | 0.8 |
| Density 20/4° C | .8711 |
| Refractive index 20/D | 1.4879 |
| Average molecular weight (cryoscopic) | 247 |

A quantity of the crude dodecyl benzene was treated with good agitation, using a turbo mixer, with 5 pounds of the equivalent of 100% sulfuric acid per barrel (42's) using a commercial white sulfuric acid having a strength on analysis of 98.5%, at a temperature of 95° F. for a period of one hour and the mixture permitted to settle overnight (16 hours). The volume of oil recovered was equal to 99.5% of the crude alkylate taken for the treat. The upper oily layer was separated from the sludge and since a quantity of pepper sludge was suspended in the upper oily layer, the pepper sludge was removed by contacting at room temperature with 1% by weight of J-M Filter-Cel and then filtered through a plate and frame press. While the use of Filter-Cel is desirable in those cases where excessive quantities of pepper sludge are suspended in the oil, it is not an intrinsic part of this invention. After filtration the sour oil was air blown to remove dissolved $SO_2$ and then split into two parts. One part was finished by percolating through 30 to 60 mesh Attapulgus clay which had been burnt at 450° F. prior to use. The conditions

*TABLE II*

ANALYSES ON NEUTRALIZED STOCK SOLUTIONS

| | Part A | Part B | Part C | Part D |
|---|---|---|---|---|
| Color-Saybolt | −10 | +2 | +12 | +28. |
| Yield-Pure Solfonate ᵃ | 94.2 | 96.8 | 97.3 | 99.8%. |
| Oily Material ᵃ | 4.8 | 2.7 | 1.9 | 0.2% |

INSPECTIONS ON DRUM DRIED PRODUCT

| | | | | |
|---|---|---|---|---|
| Color | Deep Brn | Buff | Yellow | White. |
| Odor | Oily | Slight oily | Fair | Excellent. |
| Consistency | Sticky | Fair | do | Dry—Good. |
| Moisture Pick-up ᵇ | 19% | 12% | 11% | 5.5%. |
| Detergency ᶜ | 85 | 90 | 95 | 120. |

ᵃ Based on 50 grams of alkylate calculated as pure dodecyl toluene.
ᵇ Exposed for 3 days at 80° F. and relative humidity of 90%.
ᶜ Soil removal at 0.5% of 40% active product compared to commercial cocoanut alcohol sulfate taken as 100.

EXAMPLE 2

Dodecyl benzene was prepared by the alkylation of benzene with a $C_{12}$ fraction of an olefin polymer having a boiling point range of 180–220° for percolation were the same as for the dodecyl toluene given in Example 1. The second part of the acid-treated, air blown dodecyl benzene was contacted at a temperature of 80° C. with one-half pound of Millwhite, a commercial contacting clay, per gallon of the alkylate and then filtered. Substantially no difference in the inspections on the finished alkylates could be determined when finished by either clay percolation or clay contacting.

Inspections on the finished alkylate were as follows:

| | |
|---|---|
| Color—Saybolt | +30 up (water white) |
| Odor | Odorless |
| Acid Wash Color | 2 |
| Bromine No | 0.1 |
| Sulfur | .002 |
| Halogen (as chlorine) | .001 |
| Percent carbon | 87.75 |
| Percent hydrogen | 12.25 |
| Density, $4^{20}$ | .8707 |
| Refractive index, $_D^{20}$ | 1.48934 |
| Refractive index, $_G^{20}$ | 1.50416 |
| Specific Dispersion$\times 10^4$ | 170 |
| Open Cup Flash, °F | 280 |
| Kinematic viscosity, centistokes at 100° F | 6.01 |
| Kinematic viscosity, centistokes at 210° F | 1.69 |
| Extinction, $K_{2650A°}$ | 0.62 |

50 grams of the above purified alkylate were sulfonated with 70 grams of 20% oleum and finished as described in Part A of Example 1. The results are given in Table III below.

*Table III*

ANALYSIS ON NEUTRALIZED STOCK SOLUTION

| | |
|---|---|
| Color—Saybolt | +29 (nearly water white) |
| Yield—Pure sulfonate | 100% |
| Oily material | 0.05% |

INSPECTION ON DRUM DRIED PRODUCT

| | |
|---|---|
| Color | White |
| Odor | Odorless |
| Consistency | Dry |
| Moisture pick-up | 2.4% |
| Detergency (0.5%) | 145 |

EXAMPLE 3

A solution of 0.1 mol of liquid sulfur trioxide (available commercially as Sulfan B) and 50 ml. of liquid sulfur dioxide was added over a period of ten minutes to 0.1 mol of an alkyl benzene similar to the acid treated and clay treated material described in Example 2 dissolved in 250 ml. of liquid sulfur dioxide. After addition of sulfur trioxide was complete the mixture was stirred an additional 30 minutes. The temperature was maintained during the addition of the acid and in the subsequent mixing at −8° C. by refluxing SO₂ under a condenser cooled with solid carbon dioxide. At the end of the mixing period the sulfur dioxide was removed by evaporation and the last traces removed by maintaining the system under vacuum. The sulfonation product was mixed with ice water, a small amount of alcohol added to aid solution and the product exactly neutralized with 50% sodium hydroxide to a pH of 7 to 7.5. The solution so obtained was then drum dried in a manner similar to the product made in Example 1, Part A. Analytical data on the sulfonated product indicated 100% yield with less than 0.1% based on the original amount of alkyl aromatic present, as non-sulfonated product. Detergency comparisons on the product were equivalent to those obtained using 20% oleum.

This is a continuation in part of application Serial No. 34,572 filed June 22, 1948, now abandoned.

What is claimed is:

1. In the production of a colorless, odorless and oil-free alkyl aryl sulfonic acid by the sulfonation of an alkyl aryl hydrocarbon produced by the alkylation of an aromatic hydrocarbon by an olefin in the presence of an alkylation catalyst, the improvement which comprises treating said alkyl aryl hydrocarbon having from 10 to 18 carbon atoms in the alkyl chain and containing olefinic and polymeric impurities with 90-98 weight per cent sulfuric acid to sulfonate the impurities substantially completely without sulfonating the alkyl aryl hydrocarbon, separating the resulting sludge, removing SO₂ from the acid-treated hydrocarbon, contacting the acid-treated hydrocarbon with a sorbent material, separating a purified alkyl aryl hydrocarbon from the sorbent material and sulfonating the purified alkyl aryl hydrocarbon to produce a colorless, odorless and oil-free alkyl aryl sulfonic acid.

2. A process according to claim 1 in which the alkyl aryl hydrocarbon is a mono-alkyl benzene in which the alkyl group contains 10–18 carbon atoms.

3. A process according to claim 1 in which the alkyl aryl hydrocarbon is dodecyl benzene.

4. A process according to claim 1 in which the alkyl aryl hydrocarbon is a mono-alkyl toluene in which the alkyl group contains 10–18 carbon atoms.

5. A process according to claim 1 in which the sorbent material is clay.

References Cited in the file of this patent

UNITED STATES PATENTS

| Number | Name | Date |
|---|---|---|
| 2,158,680 | Retailliau | May 16, 1939 |
| 2,261,206 | Archibald | Nov. 4, 1941 |
| 2,297,292 | Davis et al. | Sept. 29, 1942 |
| 2,364,782 | Flett | Dec. 12, 1944 |
| 2,413,161 | Zerner et al. | Dec. 24, 1946 |
| 2,422,926 | Reeves | June 24, 1947 |
| 2,439,457 | Donleavy et al. | Aug. 13, 1948 |
| 2,448,184 | Lemmon | Aug. 31, 1948 |
| 2,479,120 | Johnstone | Aug. 16, 1949 |
| 2,509,863 | Harlan | May 30, 1950 |
| 2,567,854 | Nixon | Sept. 11, 1951 |